United States Patent
Perttu

(10) Patent No.: US 7,299,585 B2
(45) Date of Patent: Nov. 27, 2007

(54) LIVE BAIT CONTAINER WITH SLIDING DOOR

(76) Inventor: Boyd Perttu, 3281 Crestmore Dr., Woodbury, MN (US) 55125

( * ) Notice: Subject to any disclaimer, the term of this patent is extended or adjusted under 35 U.S.C. 154(b) by 0 days.

(21) Appl. No.: 10/795,782

(22) Filed: Mar. 8, 2004

(65) Prior Publication Data

US 2005/0193621 A1 Sep. 8, 2005

(51) Int. Cl.
*A01K 97/04* (2006.01)
(52) U.S. Cl. ............................................. 43/56
(58) Field of Classification Search .................. 43/56, 43/55, 54.1, 4, 44.99; 206/315.11, 408; 119/203
See application file for complete search history.

(56) References Cited

U.S. PATENT DOCUMENTS

| 1,566,860 | A | * | 12/1925 | Hainzigianis | ............ | 206/362.1 |
| 1,844,285 | A | * | 2/1932 | Johnson | ...................... | 206/445 |
| 2,024,692 | A | * | 12/1935 | Kirmss | .................... | 206/362.3 |
| 2,531,628 | A | | 11/1950 | Janisch | | |
| 2,663,115 | A | | 12/1953 | McKissack | | |
| 3,000,132 | A | | 9/1961 | Koistinen | | |
| 3,002,312 | A | | 10/1961 | Barker | | |
| 3,727,748 | A | * | 4/1973 | Brown | .................... | 206/362.1 |
| 3,955,306 | A | | 5/1976 | Handa | | |
| 4,686,788 | A | | 8/1987 | Hartman | | |
| 4,864,769 | A | | 9/1989 | Sandahl | | |
| 5,109,625 | A | | 5/1992 | Skrede | | |
| 5,394,639 | A | | 3/1995 | Tentler | | |
| 6,543,179 | B1 | * | 4/2003 | Lee | ............................... | 43/61 |
| 6,729,066 | B1 | * | 5/2004 | Howley | ...................... | 43/54.1 |
| 2002/0020104 | A1 | * | 2/2002 | Kolar et al. | .................... | 43/55 |

* cited by examiner

*Primary Examiner*—Kurt Rowan
(74) *Attorney, Agent, or Firm*—Allen J. Oh; Conrad A. Hansen; Moore & Hansen, PLLP

(57) ABSTRACT

A bait container for storing bait in water incorporates a perforated carriage that slides vertically within a housing. Raising the carriage extracts the bait from the water and obviates the need to immerse a hand in cold water. A post extends upward from the carriage. A door can be moved in a vertical plane to cover an access opening. A rigid link is fixed to the door and extends inward to pass through a slot in the post. The slot locks the door, raises the door, and limits or prevents over-raising of the door. The post is free-sliding so as to cause the door to close unless held open, reducing the likelihood of bait egress. The door can be locked in a closed position using a rotatable latch arrangement to protect further against bait egress.

9 Claims, 3 Drawing Sheets

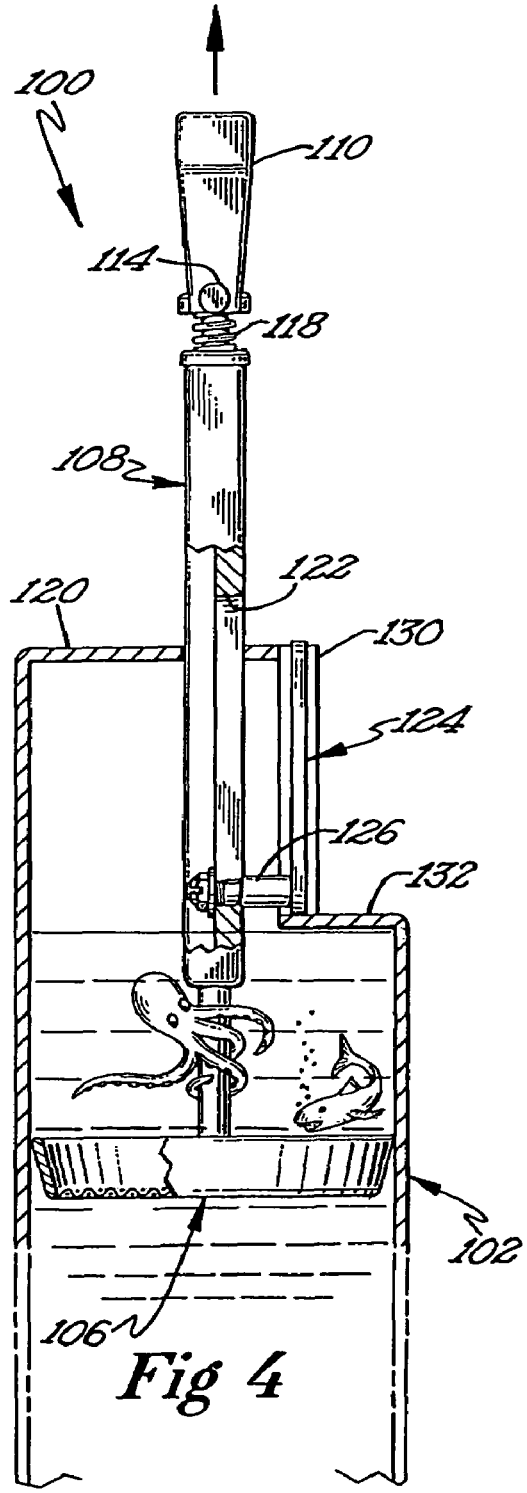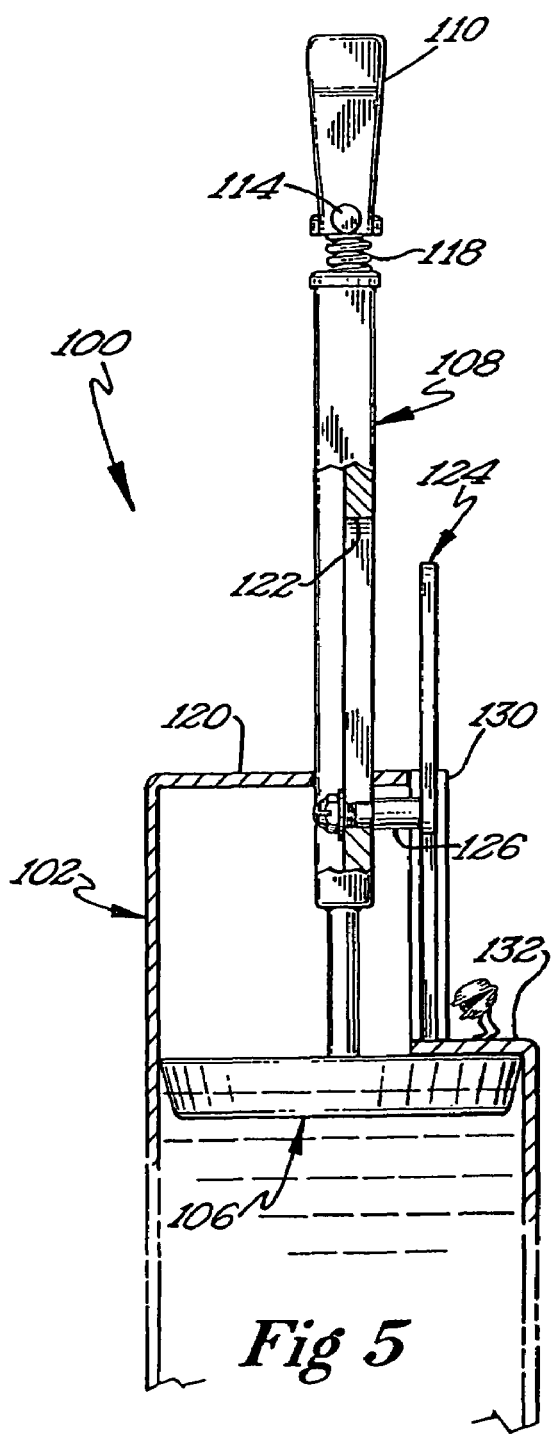

LIVE BAIT CONTAINER WITH SLIDING DOOR

TECHNICAL FIELD

The disclosure relates generally to fishing equipment. More particularly, the disclosure relates to containers for holding live bait.

BACKGROUND

Many fishermen find that live bait is more effective than nonliving bait for attracting fish. However, live bait is also more difficult to work with in that it must be contained in such a way as to maintain the bait in a live state. For example, bait fish, such as minnows, must be kept in water. Such minnows conventionally have been kept in a bucket of water. To retrieve a minnow, a fisherman immerses a hand in the water and feels around for a minnow. The fisherman must then grasp and maintain a grip on the minnow until the minnow can be secured on a hook.

Retrieving minnows in this manner can be difficult because the water is often cold. As a result, immersing a hand in the water may be uncomfortable. Further, cold water has a numbing effect that impairs the sensory and motor capabilities of the fisherman's hand and renders establishing and maintaining a grip on the minnow difficult.

A minnow bucket can be used to store live minnows in water. Some conventional minnow buckets incorporate a perforated lift plate or basket that can be raised above a water level in the container. Raising the lift plate or basket separates the minnows from the water, allowing the fisherman to retrieve a minnow without having to immerse a hand in the water. Discomfort and numbness associated with immersing the hand in cold water can thus be avoided.

Such minnow buckets typically provide access to the minnows via an access opening. The access opening may be covered, for example, by a removable cover or a door when access to the minnows is not required. In some minnow buckets, the door can lock in an open position. If the door is locked in this position, minnows can escape by leaping out of the bucket, resulting in lost bait. Similarly, in minnow buckets incorporating a removable cover, failure to replace the cover can allow minnows to escape.

SUMMARY OF THE DISCLOSURE

According to various example implementations, a bait container incorporates a perforated carriage that slides vertically within a housing. A vertical post extends upward from the carriage. A door can be moved in a vertical plane to cover an access opening. A rigid link is fixed to the door and extends inward to pass through a slot in the post. The slot in the post locks the door, raises the door, and limits or prevents over-raising of the door. The post is free-sliding so as to cause the door to drop and close unless held open. The door can be locked in a closed position using a rotatable latch arrangement.

In one implementation, a bait container includes a housing defining an access opening and a central axis. A carriage is located within the housing and is at least partially perforated carriage. A post extends from the carriage substantially along the central axis and is movable along the central axis. A door is substantially located in a vertical plane parallel to the central axis. The door is arranged to move in the vertical plane between an open position to expose the access opening and a closed position to at least partially cover the access opening in response to movement of the post along the central axis.

Various implementations may provide certain advantages. For example, by lifting bait out of the water in which it is stored, the bait container obviates the need to immerse a hand in potentially uncomfortable cold water. Because the door drops and closes unless it is held open, the likelihood of bait fish escaping from the bait container is reduced. Locking the door using a rotatable latch arrangement may provide an additional degree of security against bait egress.

Additional advantages and features will become apparent from the following description and the claims that follow, considered in conjunction with the accompanying drawings.

BRIEF DESCRIPTION OF THE DRAWINGS

FIG. 3 is a cross-sectional view taken across line 3-3 of FIG. 1.

FIG. 4 is a cross-sectional view illustrating one example configuration of the live bait container illustrated in FIG. 1.

FIG. 5 is a cross-sectional view illustrating another example configuration of the live bait container illustrated in FIG. 1.

DETAILED DESCRIPTION OF VARIOUS EMBODIMENTS

Various embodiments allow the user to retrieve a minnow from the bucket without immersing the user's hand in potentially very cold water. In particular, a bait container for storing bait in water incorporates a perforated carriage that slides vertically within a housing. The carriage can be raised and lowered by operation of a handle or similar mechanism. Water can pass through the perforated carriage, but bait is retained by the carriage as it passes through the water. As a result, the bait is raised from the water. A post extends upward from the carriage. A door can be moved in a vertical plane to cover an access opening. A rigid link is fixed to the door and extends inward to pass through a slot in the post. The slot locks the door, raises the door, and limits or prevents over-raising of the door. The post is free-sliding so as to cause the door to close unless the door is held open, reducing the likelihood of bait fish escaping from the bait container. The door can be locked in a closed position using a rotatable latch arrangement to provide an additional degree of security against bait egress.

In the following description, numerous specific details are set forth in order to provide a thorough understanding of various embodiments. It will be apparent to one skilled in the art that various embodiments may be practiced without some or all of these specific details. In other instances, well known components and process steps have not been described in detail in order to avoid unnecessarily obscuring the present invention.

Figure 1:
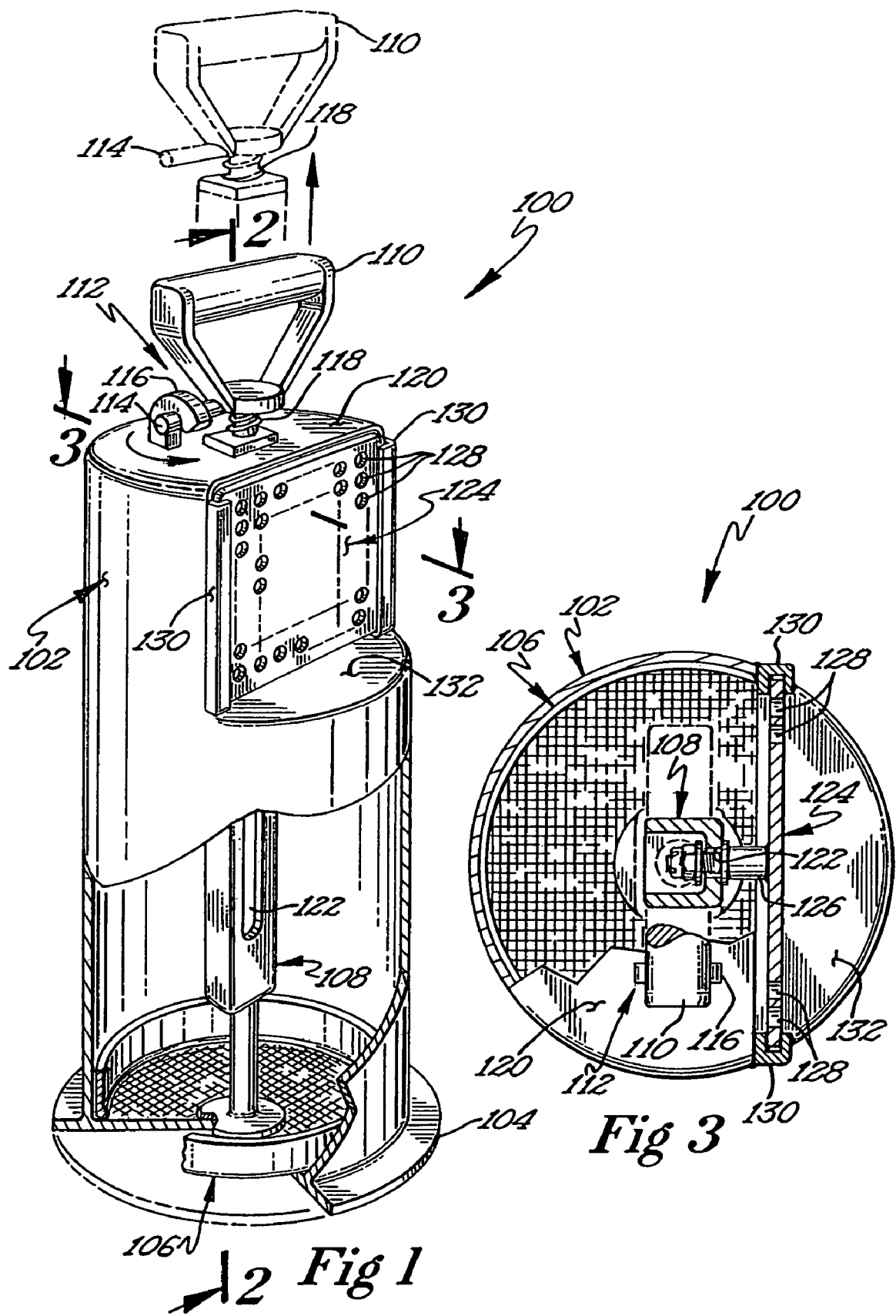
FIG. 1 is a perspective view of a live bait container according to one embodiment.

Unless otherwise noted, terms indicating the relative location of various components are provided with reference to the orientation depicted in FIG. 1. Examples of such terms include, but are not limited to, "above," "below," "over," "under," "horizontal," and "vertical."

Figure 2:
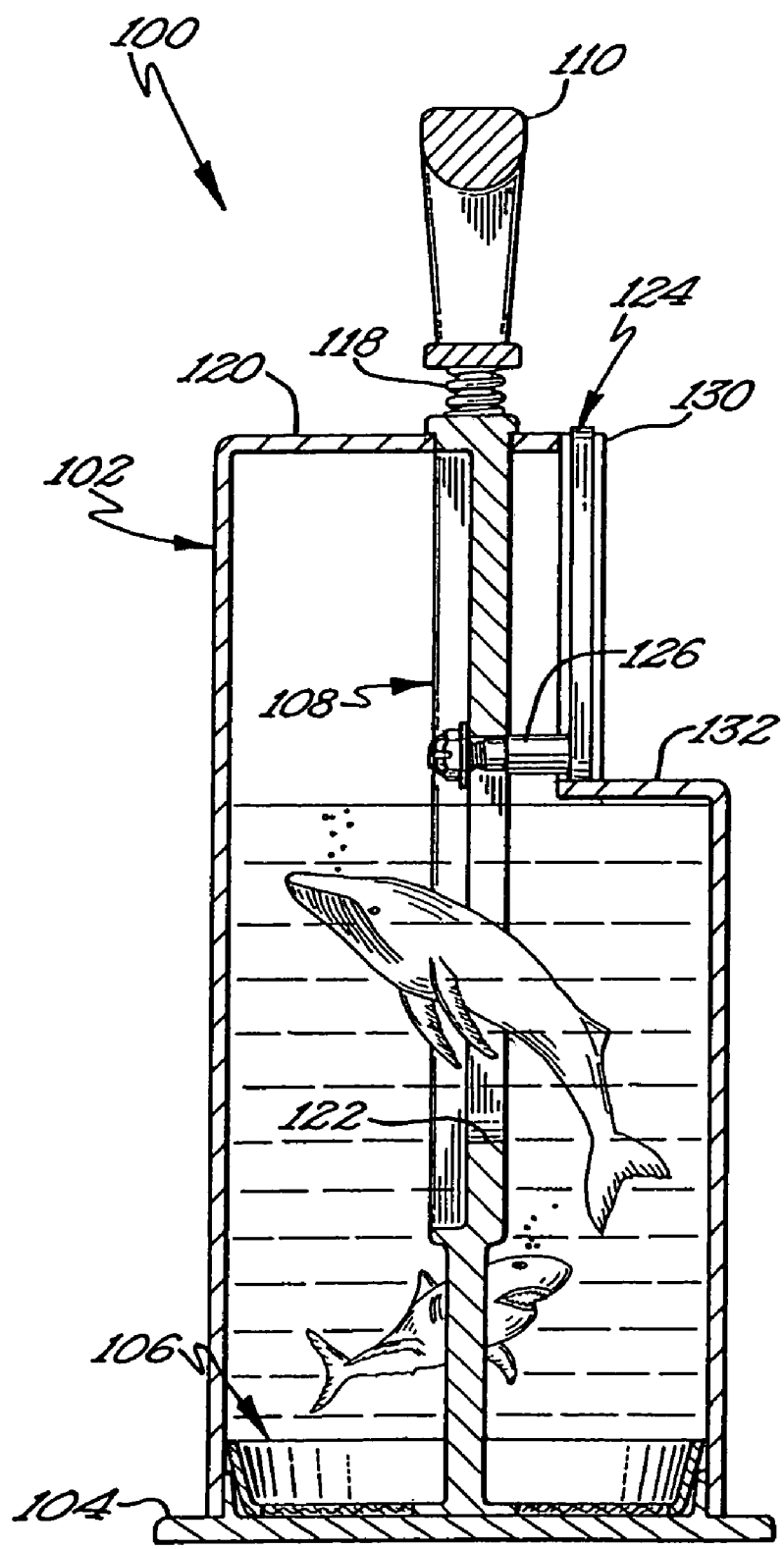
FIG. 2 is a cross-sectional view taken across line 2-2 of FIG. 1.

Referring now to the drawings, FIGS. 1, 2, and 3 illustrate a live bait container 100 according to one embodiment. FIG. 2 is a cross-sectional view of the live bait container 100 taken across lines 2-2 of FIG. 1. FIG. 3 is a cross-sectional view of the live bait container 100 taken across lines 3-3 of FIG. 1.

A housing 102 defines a space for storing water and live bait, such as minnows, as well as an access opening for retrieving bait. The housing 102 also defines a central axis generally coincident with line 2-2. The housing 102 may be generally cylindrical in shape, as depicted in FIG. 1, or may have another shape. For example, the housing 102 may be polyhedral. The housing 102 may include a lip 132 to hinder escape of bait from the housing 102. While not required, the housing 102 may include or be attached to a base 104 to improve stability.

A carriage 106 is located within the space defined by the housing 102. The carriage 106 is at least partially perforated to allow passage of water as the carriage 106 is moved through the water, i.e., as the carriage 106 is raised or lowered. The perforations may be implemented as shown in FIG. 1 or as larger or smaller apertures. Because the carriage 106 raises the bait out of the water, however, the perforations should be small enough to prevent the bait from also passing through the perforations.

A post 108 extends vertically from the carriage 106 along the central axis and can be raised and lowered, as indicated by the dashed lines in FIG. 1, by operation of a handle 110. An optional rotatable latch arrangement 112 may be used to lock the post 108 in a lowered position. As illustrated in FIG. 1, the rotatable latch arrangement 112 is formed by a pin 114 and a hook 116. A spring 118 biases the handle 110 at a predetermined level above a top surface 120 of the housing 102. A user can push the handle 110 below this level and rotate the handle 110 to move the pin 114 into alignment with the hook 116. When the user releases the handle 110, the spring 118 returns the handle 110 to the predetermined level, and the pin 114 engages the hook 116 to secure the post 108 in the lowered position. The post 108 can be raised subsequently by pushing the handle 110 below the predetermined level and rotating the handle such that the pin 114 is no longer aligned with the hook 116.

The post 108 defines an elongated slot 122 substantially located along the central axis. A door 124 lies in a vertical plane substantially parallel to the central axis and at least substantially covers the access opening when it is in a closed position. A rigid link 126 is fixed to the door 124 and extends inward to pass through the slot 122. The rigid link 126 interacts with the slot 122 to raise or lower the door 124 within the vertical plane. Operation of the door 124 and interaction between the rigid link 126 and the slot 122 are described in greater detail below in connection with FIGS. 4 and 5. The door 124 preferably has one or more ventilation ports 128 to facilitate air exchange between the water and the ambient environment outside the housing 102. With air exchanged between the water and the ambient environment, the water is oxygenated, promoting prolonged vitality of the bait.

As the door 124 is raised or lowered, its movement is guided by tracks 130, which may be molded integrally with the housing 102. Alternatively, the tracks 130 may be formed separately from and welded or otherwise attached to the housing 102. The tracks 130 ensure that the door 124 slides within the vertical plane. In addition, the tracks 130 retain the door 124 in a position covering the access opening when the door 124 is lowered to a closed position.

FIG. 2 illustrates the live bait container 100 with the carriage 106 at its lowest position. With the carriage 106 at this position, minnows or other bait fish contained within the housing 102 are free to swim to any height lower than the water level. Water may fill the housing 102 to any level lower than the door 124, i.e., lower than the lip 132 in the embodiment depicted in FIG. 2. To reduce splashing, however, it is often beneficial to fill the housing 102 with water to a level substantially below the lip 132.

To access bait, the user lifts the handle 110, causing the post 108 to be raised. As the post 108 is initially raised, the rigid link 126 travels within the elongated slot 122. Accordingly, the rigid link 126 remains relatively stationary during this initial raising of the post 108, and the door 124 remains closed. By contrast, the carriage 106 is raised. As the carriage 106 passes through the water, it may engage bait and cause the bait to be raised. Because the door 124 remains closed, however, bait egress is prevented.

As the user continues to lift the handle 110, the rigid link 126 continues to travel within the elongated slot 122. When the rigid link 126 reaches the bottom of the elongated slot 122, the post 108 catches the rigid link 126, and movement of the door 124 is linked to movement of the post 108. FIG. 4 depicts the live bait container 100 with the post 108 raised to this position. As the user raises the post 108 above the position illustrated in FIG. 4, the interaction of the rigid link 126 with the post 108 raises the door 124 toward an open position.

FIG. 5 depicts the live bait container 100 with the door 124 in the open position. The user moves the door 124 to this position by lifting the handle 110 fully. With the door 124 in the open position, the access opening is substantially fully uncovered, and the user can retrieve bait located in the carriage 106. Because the bait is no longer submerged in water, it may instinctually attempt to return to the water by jumping out of the carriage 106. The lip 132 hinders the bait from escaping in this manner.

After the user has retrieved bait, the user can return the door 124 to the closed position by releasing the handle 110, causing the handle 110 and the post 108 to descend. During this descent, the door 124 is lowered to the closed position. After the post 108 descends lower than the position depicted in FIG. 4, movement of the door 124 is no longer linked to movement of the post 108. Accordingly, the post 108 can continue to descend to the position depicted in FIG. 2 even after the door 124 is fully closed.

The combination of the slot 122 and the rigid link 126 provides a greater distance over which the carriage 106 can travel. Without the slot 122, that is, if the door 124 were attached to the post 108, the distance over which the carriage 106 could travel would be limited by the distance over which the door 124 travels. In particular, the distance over which the carriage 106 could travel, and therefore the height of the housing 102, would need to be sufficiently short that the carriage 106 would be raised to the level of the door 124 when the door 124 is fully open. Accordingly, the carriage 106 could travel a distance no greater than the height of the door 124. By contrast, because the slot 122 allows the carriage 106 to travel over a greater distance, this constraint does not limit the height of the housing 102. As a result, a taller housing 102 may be employed, providing greater storage capacity.

As demonstrated by the foregoing discussion, various implementations may provide certain advantages. For example, by lifting bait out of the water in which it is stored, the bait container obviates the need to immerse a hand in potentially uncomfortable cold water. Because the door drops and closes unless it is held open, the likelihood of bait fish escaping from the bait container is reduced. Locking the door using a rotatable latch arrangement may provide an additional degree of security against bait egress.

It will be understood by those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A bait container comprising:
   a housing defining an access opening, a central axis, and a chamber to accommodate water and bait therein;
   a carriage located within the housing, the carriage defining at least one perforation to allow the passage of water therethrough;
   a post extending from the carriage substantially parallel to the central axis and movable in a direction substantially parallel to the central axis, the post defining an elongated slot located substantially parallel to the central axis; and
   a door substantially located in a vertical plane parallel to the central axis and comprising a rigid link arranged to travel within the elongated slot and to interact with the post to cause the door to move in the vertical plane between an open position to expose the access opening and a closed position to at least partially cover the access opening and hinder egress of the bait from the chamber in response to movement of the post in the direction substantially parallel to the central axis.

2. The bait container of claim 1, wherein:
   the elongated slot is located substantially along the central axis; and
   the post extends from the carriage substantially along the central axis and is movable substantially along the central axis.

3. The bait container of claim 1, further comprising a handle connected to the post and arranged to move the post along the central axis.

4. The bait container of claim 3, further comprising a locking arrangement for selectively securing the post, thereby maintaining the door in the closed position.

5. The bait container of claim 4, wherein the locking arrangement comprises a rotatable latch arrangement.

6. The bait container of claim 1, further comprising a plurality of tracks arranged to guide the door to move in the vertical plane.

7. The bait container of claim 6, wherein the tracks are formed integrally with the housing.

8. The bait container of claim 1, wherein the housing defines a lip proximate the access opening to hinder egress of live bait.

9. The bait container of claim 1, wherein the housing is cylindrical in shape.

* * * * *